310-369
8/23/83   XR   4,400,641   SR

United States Patent [19]
Vishnevsky et al.

[11] 4,400,641
[45] Aug. 23, 1983

[54] PIEZOELECTRIC MOTOR WITH TWO PART ROTOR

[75] Inventors: Vladimir S. Vishnevsky; Vitaly S. Koval; Vyacheslav V. Lavrinenko; Oleg L. Boichenko; Igor A. Kartashev; Jury V. Golovyashin; Nikolai F. Serov; Leonid I. Shinkarenko; Oleg G. Jurash, all of Kiev, U.S.S.R.

[73] Assignee: Kievsky Politekhnichesky Institut, Kiev, U.S.S.R.

[21] Appl. No.: 369,181

[22] Filed: Apr. 16, 1982

[51] Int. Cl.³ .............................. H01L 41/08
[52] U.S. Cl. .................... 310/323; 310/328; 310/369
[58] Field of Search ............... 310/322, 323, 328, 330, 310/331, 332, 367–369

[56] References Cited
FOREIGN PATENT DOCUMENTS

| | | | |
|---|---|---|---|
| 625273 | 8/1978 | U.S.S.R. | 310/328 |
| 632014 | 11/1978 | U.S.S.R. | 310/328 |
| 636760 | 12/1978 | U.S.S.R. | 310/328 |
| 642802 | 1/1979 | U.S.S.R. | 310/328 |
| 651435 | 3/1979 | U.S.S.R. | 310/328 |
| 661661 | 5/1979 | U.S.S.R. | 310/328 |

Primary Examiner—Mark O. Budd
Attorney, Agent, or Firm—Myron Greenspan; Burton L. Lilling; Bruce E. Lilling

[57] ABSTRACT

A piezoelectric motor of the invention comprises a stator and a rotor one of which includes at least one first piezoelectric oscillator. The rotor consists of a first and a second parts one of which parts includes a second piezoelectric oscillator. Said parts of the rotor are mounted for relative rotation about the axis of rotation. The first part is in contact with the stator along the first surface of frictional interaction and with the second part along the second surface of frictional interaction. Each surface of frictional interaction is formed by rotation of at least one straight line length about the axis of rotation of the rotor.

44 Claims, 39 Drawing Figures

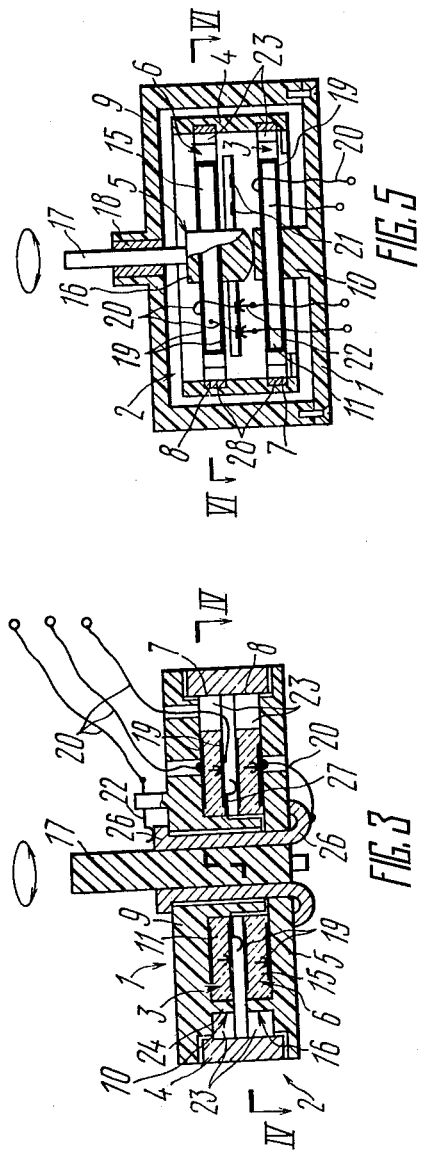
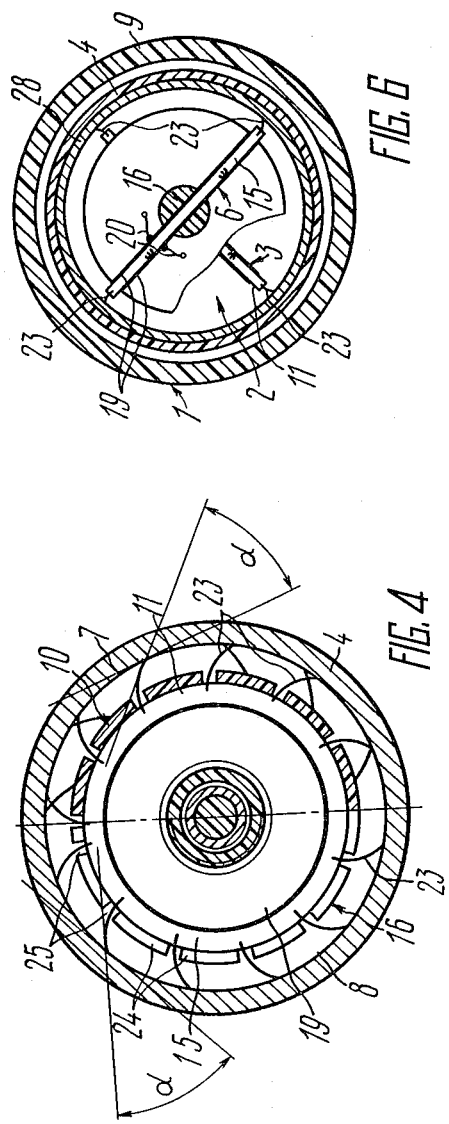

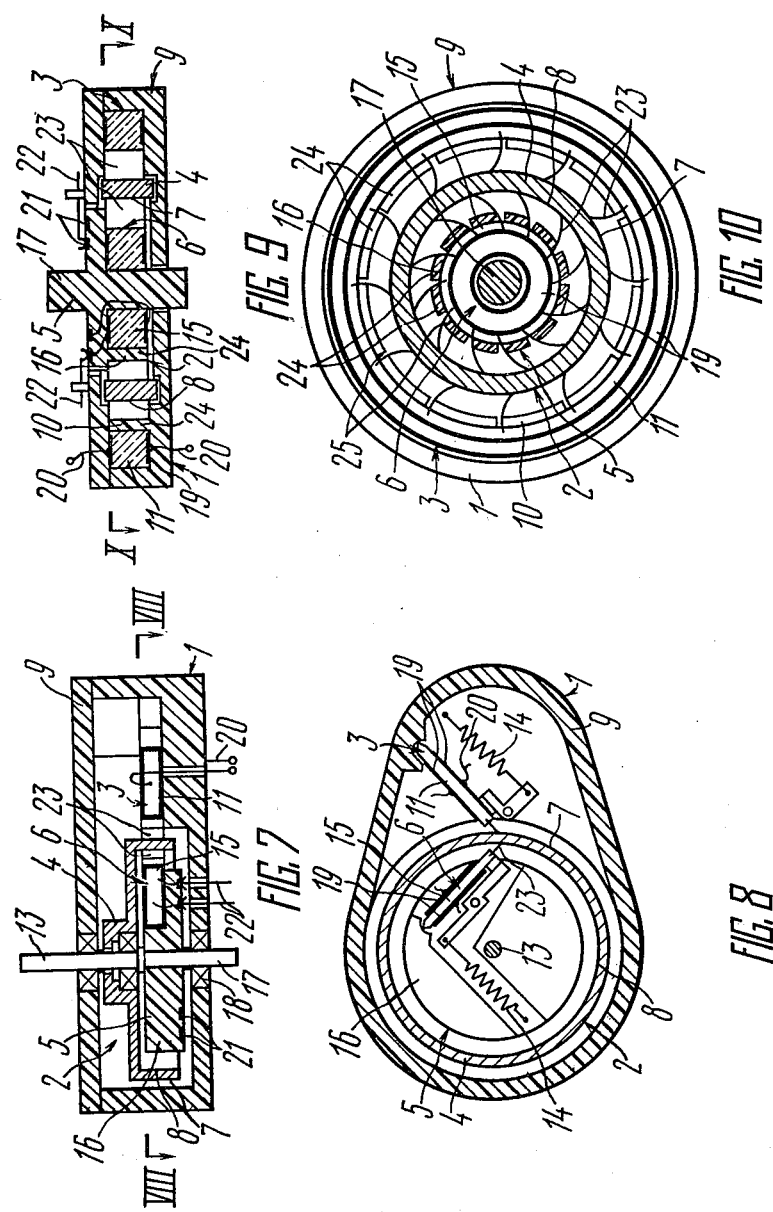

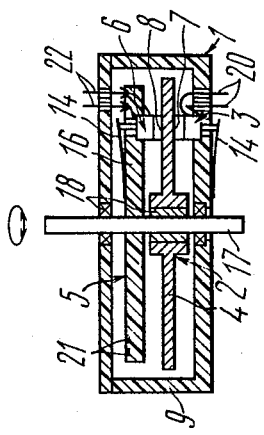
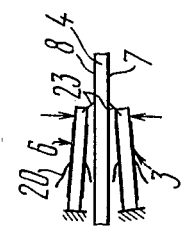
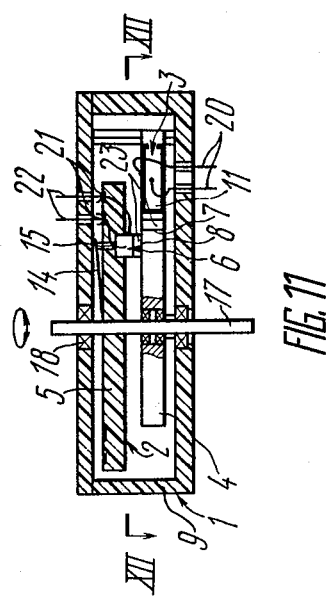
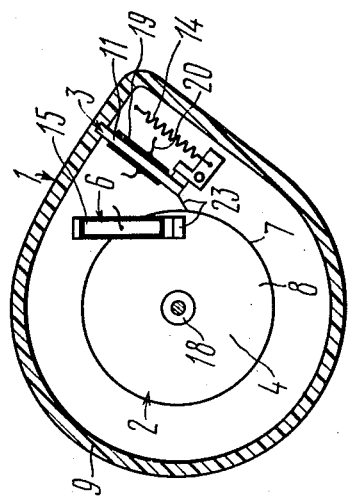

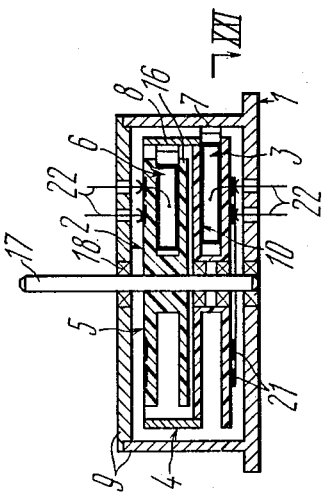
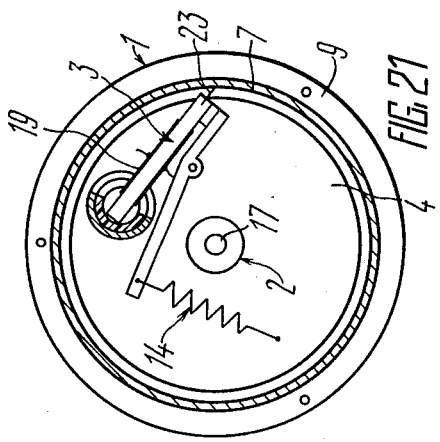
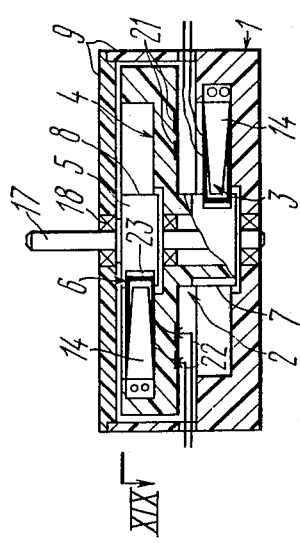
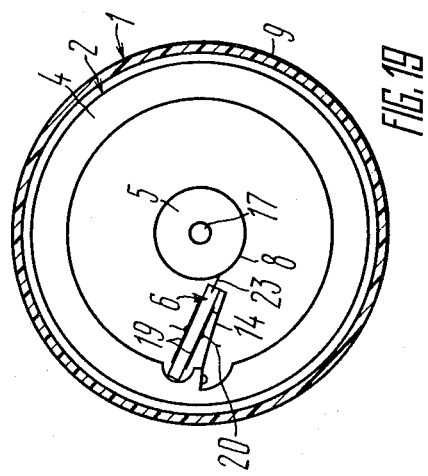

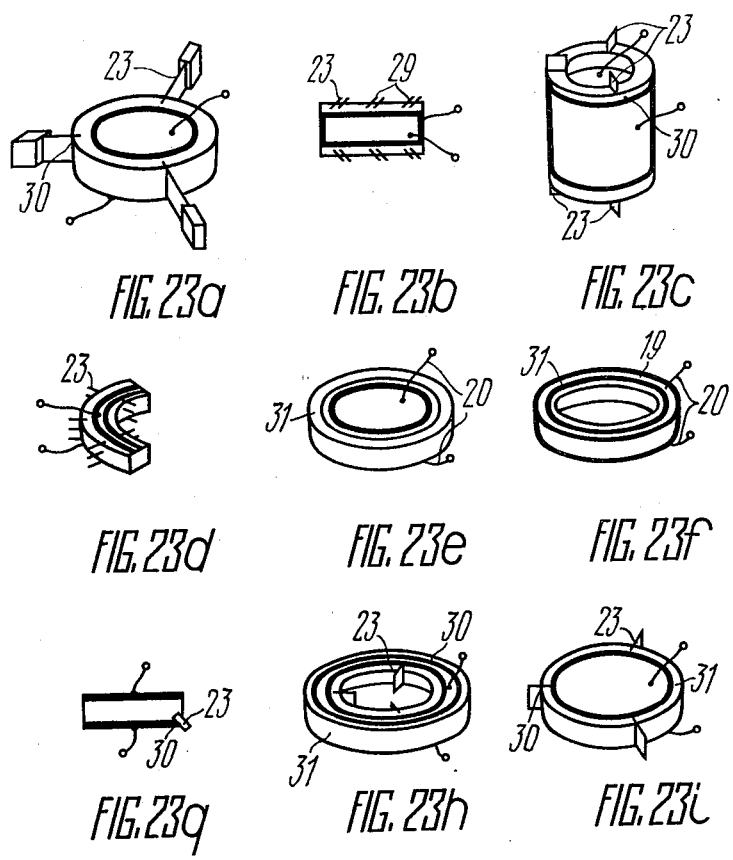
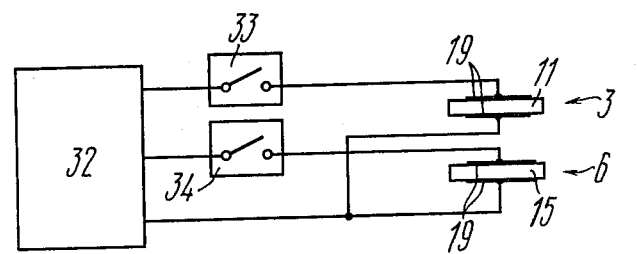

PIEZOELECTRIC MOTOR WITH TWO PART ROTOR

BACKGROUND OF THE INVENTION

1. Field of the Invention

The present invention relates to electric motors, and more specifically is concerned with a piezoelectric motor.

The piezoelectric motor of the invention is intended for wide application as a micropower motor of actuating means in automatic systems, or as a motor for tape transport mechanisms in tape recorders, photographic equipment, servosystems, and various domestic appliances.

2. Prior Art

As present there are known piezoelectric motors which convert electric energy into mechanical energy in the form of angular motion or continuous rotation of the rotor thereof.

U.S. Pat. No. 4,019,073 discloses a piezoelectric motor comprising a stator which is rigidly mounted with respect to the motor support, and a rotor which is a movable member of the motor and is rotatably mounted, for instance, in bearings on the stator.

Unlike electric motors utilizing electromagnetic interaction between the stator and rotor, a piezoelectric motor operates on frictional interaction between the stator and rotor, that is at the expense of frictional forces. Therefore, when de-energized the rotor is kept at rest by a certain frictional torque and to make it rotate it is necessary to apply a moment of force which overcomes a frictional force. The torque in the stator or rotor of a piezoelectric motor is developed by a piezoelectric oscillator (also known as a piezoelectric vibrator) which is an electromechanical resonator incorporating a piezoelectrically active member, that is a piezoelectric element. The piezoelectric element is made from mono- or polycrystalline piezoelectric material which is electrically polarized in one direction. It also includes at least two electrodes made, for instance, in the form of thin metal coating, to which electrodes are generally connected metal leads adapted to connect the piezoelectric element to an alternating voltage source, with the frequency of the power source being normally selected equal or close to the resonant frequency of the oscillator.

When the piezoelement is connected to the above-type power source elastic vibrations are produced in it at the expence of the piezoelectric effect, which vibrations cause the whole oscillator to vibrate, said oscillator being acoustically insulated within the stator.

The rotor and stator in the prior art piezoelectric motor are urged against each other at the location of the working surface of the piezoelectric oscillator to provide their frictional interaction along the surface formed by rotation of at least one length of a straight line. The term "working surface" of the piezoelectric oscillator is used to mean that surface of said oscillator which is subject to wear when in use. On said frictional interaction surface there takes place conversion of the oscillator mechanical oscillations into a unidirectional tangentional force which varies in magnitude and which when applied to said surface causes the torque to develop. In other words the frictional contact zone functions as a rectifier to convert alternating mechanical stress into pulsating one.

The amount of stress in the oscillator and oscillation frequency thereof determine the torque and r.p.m. of the rotor in a piezoelectric motor. The stress and mechanical oscillations in the oscillator are related to each other through a coefficient of elasticity of the material used. Therefore, the torque and speed of rotation of the rotor in a piezoelectric motor have a linear relationship therebetween, that is the piezoelectric motor has a drooping load characteristic. This, however, cannot be considered as a disadvantage of a piezoelectric motor, since it is a drooping characteristic which is frequently required. In some cases, however, a flat characteristic is required, which characteristic is generally obtained with the aid of electronic circuits adapted to stabilize the r.p.m. of a piezoelectric motor. Furthermore, motors used in tape recorders and electric record players must have step variation of the rotational speed which is preferably effected without lowering its torque, since otherwise a detonation coefficient will markedly increase. It is to be noted in this connection that the prior art piezoelectric motor construction does not practically allow a stepwise variation of the rotational speed without changing the rotational moment.

Another disadvantage of the prior art piezoelectric motor is that its construction does not provide a wide range of the r.p.m. variation, as with the speed decrease the rotor motion becomes more and more irregular, which is also caused by the torque decrease, in which case the torque becomes commensurable with the load torque variations.

In addition, the problem of the rotational speed reverse has not been completely solved in the prior art piezoelectric motor. As a matter of fact non-reversal motors have high load torques, high efficiency, and a long service length. They feature a low noise operation, and are supplied from simple electric supply circuits. The reverse in the prior art piezoelectric motor is effected by exciting mechanical oscillations of two types, that is longitudinal and transverse ones, in which case the piezoelectric element must have two layers which complicates to a great extent its electrode topology and polarization. Such construction also affects Cos φ of the piezoelectric element, decreases piezoelectrically active zone, and hence causes higher voltage supply. The presence of several layers bonded with each other affects the strength of the piezoelement, and flexural vibration occurring in monomorphic piezoelectric elements deteriorates load matching therein and brings down its efficiency as a result. At present the efficiency of reversible piezoelectric motors does not exceed 10% which does not allow these motors to meet many technical requirements, whereas the efficiency of non-reversible piezoelectric motors may exceed 80%. The service life of the piezoelectric motors having rotors made from superhard materials does not exceed 100 hours, while the service life of the non-reversible motors is in excess of 1,000 hours.

A further disadvantage of the prior art piezoelectric motor is that is has one shaft. In some cases, however, there is a need that the motor have two or more shafts with different rotational speeds. For instance, the use of a two-shaft piezoelectric motor in a tape transport mechanism of tape recorders may considerably simplify kinematics of such mechanisms.

SUMMARY OF THE INVENTION

The principal object of the invention is to provide a piezoelectric motor which is capable, due to improvements in its construction, of discretely varying the direction and rotational speed, with its torque remaining constant.

Another object of the invention is to enhance the efficiency of the motor.

Yet another object of the invention is to increase the service life of a piezoelectric motor.

Still another object of the invention is to bring down amount of labor required for manufacturing a piezoelectric element for the piezoelectric oscillator.

A further object of the invention is to improve the reliability of a piezoelectric motor in operation.

Still further object of the invention is to permit the application of a two-shaft piezoelectric motor.

These and other objects of the invention are attained in that in a piezoelectric motor comprising a rotor and stator one of which includes at least one piezoelectric oscillator, said rotor and stator being urged against each other at the location of the working surface of the piezoelectric oscillator to provide their frictional interaction along the surface formed by rotation of at least one length of a straight line about the axis of rotation of the rotor, and wherein according to the invention the rotor consists of a first part and a second part, one of which parts includes at least one additional piezoelectric oscillator, the first part frictionally interacting with the stator, said parts are arranged for relative rotation about the axis of rotation of the rotor and urged against each other at the location of the working surface of the additional piezoelectric oscillator to provide frictional interaction of these parts along the other surface which is formed by rotation of at least one length of a straight line about the axis of rotation of the rotor.

It is desirable that the surface of frictional interaction of the first part of the rotor and the stator be located on said stator, and surface of frictional interaction of the two parts of the rotor be located on the first part of this rotor.

It is possible that the surface of frictional interaction of the first part of the rotor and the stator be located on said stator and the surface of frictional interaction of the two parts of the rotor be located on the second part of this rotor.

It is also possible that the surface of frictional interaction of the first part of the rotor and the stator be located on the first part of said rotor, and the surface of frictional interaction of the two parts of the rotor be located on the second part of this rotor.

The surface of frictional interaction of the first part of the rotor and the stator as well as the surface of frictional interaction of the both parts of the rotor may be located on the first part of the rotor.

The stator may include a body the portion of whose surface is formed by rotation of at least one length of a straight line about the axis of rotation of the rotor.

A modification of the proposed motor is possible wherein said portion of the surface of such a stator constitutes a working surface of at least one piezoelectric oscillator disposed within the stator against which working surface of this oscillator is urged one end of at least one plate having its second end secured on the first part of the rotor.

It is also possible that the first part include at least one piezoelectric oscillator having its working surface urged against said surface of the stator.

The first part of the rotor may include a body having a portion of its surface formed by rotation of at least one length of a straight line about the axis of rotation of this rotor.

In this case said portion of the surface may be a working surface of at least one additional piezoelectric oscillator disposed within the first part of the rotor, and to said working surface may be forced one end of at least one plate whose second end may be secured on the second part of the rotor.

Furthermore, the second part of the rotor may include at least one additional piezoelectric oscillator having its working surface forced to said portion of the surface of the first part of the rotor.

It is desirable that said portion of the surface of the first part of the rotor be a working surface of at least one piezoelectric oscillator enclosed in the first part, against which working surface is urged one end of at least one plate having its other end fastened on the stator.

It is also desirable that the stator include at least one piezoelectric oscillator having its working surface urged against said portion of the first part of the rotor.

A modification is possible wherein the second part of the rotor may include a body having a portion of its surface formed by rotation of at least one length of a straight line about the axis of rotation of the rotor.

In this case said portion of the surface of the second part of the rotor may be a working surface of at least one additional piezoelectric oscillator enclosed in the second part of the rotor, against which working surface may be urged at least one plate at its one end, which plate having its other end fastened on the first part of the rotor.

The first part of the rotor may also include at least one additional piezoelectric oscillator whose working surface is urged against said portion of the surface of the second part of the rotor.

There are also possible modifications wherein the first part of the rotor may include two bodies each having a portion of its surface formed by rotation of at least one length of a straight line about the axis of rotation of the rotor.

In this case said portion of the surface of one body may be a working surface of at least one piezoelectric oscillator enclosed in the first part of the rotor, and at least one plate may be urged at its one end against said working surface, which plate having its other end secured on the stator.

Furthermore, the stator may include at least one piezoelectric oscillator having its working surface urged against said portion of one body of said first part of the rotor.

It is further possible that said portion of the surface of the other body be a working surface of at least one additional piezoelectric oscillator enclosed in the first part of the rotor, and at least one plate be urged at its one end against said working surface, which plate having its other end secured on the second part of the rotor.

In this case the second part of the rotor may include at least one piezoelectric oscillator having its working surface urged against said portion of the other body of the first part of the rotor.

In the processed embodiments of the invention the angle of contact between at least one of the plates and the working surface of the piezoelectric oscillator and the angle of contact between at least one of the plates and the working surface of the additional piezoelectric oscillator may have identical signs.

It is further possible that the angle of contact between at least one of the plates and the working surface of the piezoelectric oscillator and the angle of contact between at least one of the plates and the working surface of the additional piezoelectric oscillator have opposite signs.

In other modifications of the proposed motor at least one of said oscillators may be disposed within the surface frictionally interacting therewith. In the alternative embodiment of the proposed motor at least one of said piezoelectric oscillators may be disposed on the outside of the surface frictionally interacting therewith.

In the proposed motor there are provided alternative modifications wherein the working surface of at least one of said piezoelectric oscillators may lie in a plane perpendicular to the axis of rotation of the rotor.

It is possible that the piezoelectric element of at least one of said piezoelectric oscillators be made in the form of a plate.

It is also possible that the piezoelectric element of at least one of said piezoelectric oscillators be made in the form of a body of rotation or a portion thereof.

It is also advisable that the piezoelectric element of at least one of said piezoelectric oscillators be provided with at least one plate secured at its one end on one of said surfaces of said piezoelectric elements and a working surface of said oscillator be located on the other end of the plate.

The angle of contact between at least one plate and the surface of frictional interaction of the first part of the rotor and the stator, and the angle between at least one plate and the surface of frictional interaction of the two parts of the rotor may have identical signs.

Further, the angle of contact of at least one plate and the surface of frictional interaction of the first part of the rotor and the stator, and the angle of contact between at least one plate and the surface of frictional interaction of the both parts of the rotor have opposite signs.

The above embodiments of the proposed piezoelectric motor make it possible to obtain electromechanical parameters in reversible piezoelectric motors, similar to those of non-reversible motors. They also allow the rotational speed of reversible piezoelectric motors to be increased 2 to 3 times as compared with similar non-reversible motors, and the controllable range of rotational speed to be increased more than 10 times. At the same time the use of additional shafts widens the field of application of piezoelectric motors.

BRIEF DESCRIPTION OF DRAWINGS

The invention will now be explained in greater detail with reference to embodiments thereof which are represented in the accompanying drawings, wherein:

FIG. 3 illustrates one modification of a piezoelectric motor of the invention, wherein the first part of the rotor is made in the form of a hollow cylinder with the plates of the piezoelectric oscillators being forced against the inner surface of said cylinder;

FIG. 4 is a section along line IV—IV in FIG. 3;

FIG. 5 is an alternative modification of what is shown in FIG. 3;

FIG. 6 is a section along the VI—VI in FIG. 5;

FIG. 7 illustrates a piezoelectric motor of the invention, wherein the piezoelectric oscillators are arranged inside and outside the first part of the rotor;

FIG. 8 is a section along line VIII—VIII in FIG. 7;

FIG. 9 is an alternative modification of what is illustrated in FIG. 7;

FIG. 10 is a section along line X—X in FIG. 9;

FIG. 11 illustrates a piezoelectric motor of the invention, wherein piezoelectric oscillators are forced against different faces of the first part of the rotor;

FIG. 12 is a section along line XII—XII in FIG. 11;

FIG. 13 is an alternative modification of what is illustrated in FIG. 11;

FIG. 14 is a sectional representation of the arrangement of the piezoelectric oscillators forced against flat faces of the first part of the rotor;

FIG. 18 illustrates a piezoelectric motor of the invention, wherein the surfaces of frictional interaction are located on the both parts of the rotor;

FIG. 19 is a section along line XIX—XIX in FIG. 18;

FIG. 20 illustrates a piezoelectric motor of the invention, in which piezoelectric oscillators are disposed on the first and the second parts of the rotor;

FIG. 21 is a section along line XXI—XXI in FIG. 20;

FIG. 23 illustrates various forms of piezoelectric oscillators in a piezoelectric motor of the invention;

FIG. 24 is a connection diagram of the piezoelectric oscillators in a piezoelectric motor of the invention.

DETAILED DESCRIPTION OF THE INVENTION

Figure 1:
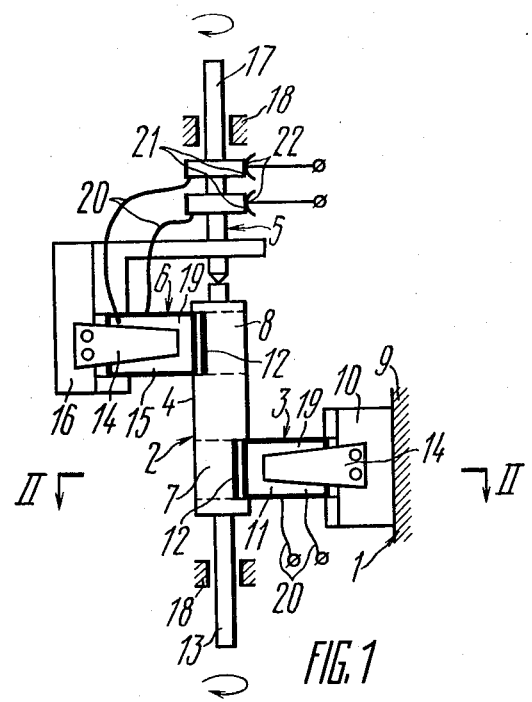
FIG. 1 illustrates the construction of a piezoelectric motor of the invention, wherein the first part of the rotor is constructed in the form of a solid cylinder.
Figure 2:
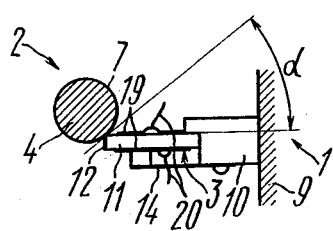
FIG. 2 is a section along line II—II in FIG. 1.

A piezoelectric motor of the invention, as shown in FIGS. 1 and 2, comprises a stator 1 and a rotor 2. The stator 1 includes a piezoelectric oscillator 3, and the rotor 2 consists of a first part 4 and a second part 5, having an additional piezoelectric oscillator 6.

It is to be noted that the proposed piezoelectric motor may incorporate several oscillators 3 and 6, the number of which oscillators is determined by a specified characteristic (higher power, higher speed, etc.).

The oscillator 3 of the stator 1 has its working surface forced against the first part 4 of the rotor 2 so as to provide a frictional interaction therebetween along a surface 7 of frictional interaction.

As defined above the term "working surface" is used to mean a wearing surface, i.e. that surface of a piezoelectric oscillator which is subjected to wear during operation of the motor.

The parts 4 and 5 are arranged coaxially for relative rotation. In this case the additional oscillator 6 has its working surface forced against the first part 4 of the rotor 2 so as to provide a frictional interaction between the parts 4 and 5 along a surface 8 of frictional interaction.

In a general case each of the surfaces 7 and 8 are surfaces which are formed by rotation of at least one length of a straight line about the axis of rotation of the rotor, which length is equal to the length of a contact line between the working surface of the oscillators 3, 6 and the corresponding part of the motor (these parts are the stator 1 and first and the second parts 4, 5 of the rotor 2).

The surfaces 7 and 8, as shown in FIGS. 1 and 2, are made cylindrical (shown by dash line).

Figure 15:
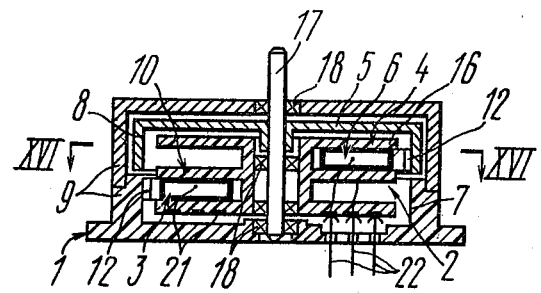
FIG. 15 illustrates a piezoelectric motor of the invention, wherein the oscillators are disposed on the first part of the rotor.
Figure 16:
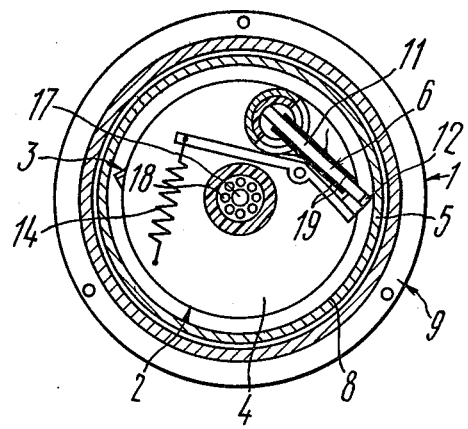
FIG. 16 is a section along line XVI—XVI in FIG. 15.
Figure 17:
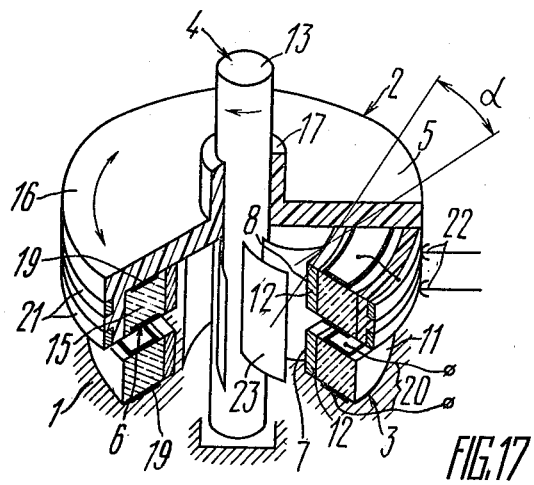
FIG. 17 illustrates a piezoelectric motor of the invention, wherein the first part of the rotor is provided with plates frictionally interacting with the working surfaces of the piezoelectric oscillators.

According to the invention the proposed piezoelectric motor may be variously constructed, with the speed and direction of rotation being discretely varied. Thus, for example, depending on the location of the surfaces of frictional interaction the following modifications of the proposed motor are possible, wherein:

(1) surfaces 7 and 8 are located on the first part 4 of the rotor 2 (FIGS. 1, 2, 3, 4, 5, 6, 7, 8, 9, 10, 11, 12, 13, 14);

(2) surface 7 is located on the first part 4 of the rotor, and the surface 8 on the second part 5 of said rotor (FIGS. 18, 19);

(3) surface 7 is located on the stator 1, and the surface 8 on the second part 5 of the rotor 2 (FIGS. 15, 16, 17);

(4) surface 7 is located on the stator 1, and the surface 8 on the first part 4 (FIGS. 20, 21).

As shown above, each surface 7 and 8 is a surface formed by rotation of at least one length of a straight line about the axis of rotation of the rotor. It should be noted that generally the number of lengths in the straight line is determined by the number of the piezoelectric oscillators being in contact with a corresponding surface. Therefore, the stator 1 and the parts 4, 5 of the rotor 2 in each modification of the proposed piezoelectric motor include a body having a portion of its surface formed by rotation of a straight line length. In particular such body may be a cylinder (FIGS. 1,2,18, 19), a hollow cylinder, a ring (FIGS. 3, 4, 5, 6, 9, 10, 17), a sleeve (FIGS. 7, 8, 15, 16, 20, 21), or a disc (FIGS. 11, 12, 13) etc.

The said body may be the oscillator proper made in the form of a body of rotation (FIG. 17).

In a modification of the proposed motor shown in FIGS. 1 and 2, the stator is substantially a frame 9 wherein a piezoelectric element 11 of the oscillator 3 is mounted and secured by means of a holder 10, said piezoelectric element being made in the form of a plate having a wear-resistant layer 12.

The first part 4 of the rotor 2 is a solid cylinder mounted on a shaft 13. The oscillator 3 is forced against a lateral surface of this cylinder with the aid of a clamping member 14 made in the form of flat spring.

The piezoelectric element 15 of the oscillator 6 is alos made in the form of a plate provided with a wear-resistant layer 12. One end of this plate is secured in the holder 16 which is mounted on the other shaft 17. The shafts 13 and 17 are mounted in bearings 18, fixed in the frame 9.

Each piezoelectric element 11 and 15 has electrodes 19 and leads 20 adapted to connect the piezoelements 11 and 15 to a power supply source (in FIGS. 1 and 2 not shown). The leads 20 of the piezoelectric element 15 are connected to the power supply source through contact rings 21 fixed on the shaft 17 and brushes 22.

Shown in FIGS. 3,4 is a modification of piezoelectric motor of the invention wherein the first part 4 of the rotor 2 is a hollow cylinder. The piezoelectric elements 11 and 15 are made in the form of rings on the outer cylindrical surfaces of which are secured plates 23. The electrodes 19 are deposited on the flat surfaces of said rings. The stator 1 and the second part 5 of the rotor 2 are made in the form of discs carrying holders 10 and 16 respectively. The holders 10, 16 are annular projections 24 embracing the piezoelectric element 11, 15 and having grooves 25 adapted to receive thereinto plates 23, in which case the free ends of the plates 23 are forced against the inner surface of the hollow cylinder mounted for rotation relative the stator 1 and the part 5. The stator 1 and the part 5 are connected one to another with the aid of a metal bushing 26, to which bushing is connected one of the electrodes 19 of the piezoelectric element 15 and against which is forced the brush 22. The other electrode of the piezoelectric element 15 is connected through a resilient contact ring 27 to one of the electrodes 19 of the piezoelectric element 11.

Shown in FIGS. 5 and 6 is another modification of the proposed piezoelectric motor, wherein the oscillators 3 and 6 are made in the form of piezoelectric plates on the end faces of which the plates 23 are secured, each at its one end. In this case the first part 4 is made substantially in the form of a hollow cylinder made of plastic material. Metal rings 28 are press-fitted within said hollow cylinder, so that the free ends of the plates 23 frictionally interact with the inner surface of said rings.

Shown in FIGS. 7 and 8 is a modification of the proposed piezoelectric motor wherein the oscillators 3 and 6 and made in the form of piezoelectric plates and the plates 23 are secured each at one its end on the end face of said piezoelectric plates. In this embodiment the first part 4 of the rotor 2 is made in the form of a sleeve mounted on the shaft 13, and the oscillator is forced at its working surface against a lateral surface of said sleeve, while to the inner surface thereof is forced the oscillator 6 located in the second part 5 of the rotor 2, having a shaft 17.

Shown in FIGS. 9 and 10 is a modification of the proposed piezoelectric motor wherein the oscillator 3 is made in the form of a ring and the plates 23 are secured on the inner cylindrical surface thereof. The oscillator 6 is also made in the form of a ring, but the plates 23 in this case are secured on the outer cylindrical surface thereof. In this embodiment the first part 4 is a hollow cylinder and the plates 23 of the oscillator 6 are forced against the inner surface of said cylinder while to the outer surface thereof are pressed the plates 23 of the oscillator 3 mounted in the frame 9 of the stator 1. On the frame 9 there is provided an annular projection 24 having grooves 25 adapted to accommodate therein the plates 23 of the oscillator 3. Similarly, the second part 5 of the rotor 2, mounted on the shaft 17 have a disc provided with an annular projection 24 embracing said oscillator 6 and having grooves 25 adapted to receive the plates 23 of the oscillator 6.

Modifications of the proposed piezoelectric motor are also possible wherein at least one of the working surfaces of the oscillators 3, 6 is located in a plane perpendicular to the axis of rotation of the rotor. FIGS. 11 and 12 illustrate the construction of the proposed piezoelectric motor wherein the oscillators 3 and 6 are made in the form of piezoelectric plates and on one of the end faces of each said piezoelectric plate is located the plate 23 which is secured at its one end to said end face of the piezoelectric plate, the working surface of the oscillators 3, 6 being located at the opposite end of the plate 23. In this case the first part 4 is made in the form of a disc mounted in the bearings 18 on the shaft 17 and the oscillator 6 is forced at its working surface against the flat surface of said disc, said oscillator 6 being secured on the second part 5 of the rotor 2 mounted on the shaft 17. The oscillator 3 secured on the frame 9 of the stator 1 is forced at its working surface against a cylindrical surface of the said disc.

A modification shown in FIGS. 13 and 14 is similar to the above one except for that the oscillator 3 is forced at its working surface not to the cylindrical surface of said disc but against the other flat surface thereof.

According to the invention also possible is a modification wherein the both piezoelectric oscillators 3,6 (FIGS. 15, 16) are disposed in the first part 4 of the rotor 2, mounted on the shaft 17. In this case the stator one is constructed in the form of a sleeve and the oscillator 3 is forced at its working surface against the inner cylindrical surface of this sleeve. The second part 5 is mounted on the shaft 17 and is also made in the form of a sleeve against the inner surface of which is forced the oscillator 6.

A modification shown in FIG. 17 is characterized by that the plates 23 are secured on the part 4 of the rotor 2. The stator 1 and the second part 5 of the rotor 2 include the piezoelectric oscillators 3,6 made in the form of rings having cylindrical wear-resistant layers 12 against the inner surfaces of which are forced the plates 23 of the first part 4 of the rotor 2.

Shown in FIGS. 18 and 19 is a modification of a piezoelectric motor of the invention wherein the oscillator 3 is made in the form of a piezoelectric plate disposed on the stator 1. In this case the oscillator 3 is forced at its working surface against a cylindrical surface 7 of the first part 4 of the rotor 2. The oscillator 6 is also disposed on the first part 4 of the rotor 2, which oscillator is made in the form of a piezoelectric plate and forced at its working surface against a cylindrical surface 8 of the second part 5 of the rotor 2.

According to the invention also possible is a modification wherein the surface 7 (FIGS. 20, 21) is located on the stator 1 and the surface 8 is located on the first part 4 of the rotor 2. In this modification of the proposed motor the stator 1 is made in the form of a sleeve against the inner cylindrical surface of which is forced the oscillator 3 disposed in the first part 4 mounted in the bearings 18 on the shaft 17. The first part 4 of the rotor 2 is substantially a sleeve against the inner cylindrical surface of which is forced the piezoelectric oscillator 6 disposed on the second part 5 mounted on the shaft 17.

Thus, as follows from the above description of the proposed motor the main parts thereof may be arranged in a following manner:
 (1) oscillator 3 may be disposed on the stator 1 (FIGS. 1, 2, 3, 4, 5, 6, 7, 8, 9, 10, 11, 12, 13, 14, 17, 18, 19) or on the first part 4 of the rotor 2 (FIGS. 15, 16, 20, 21);
 (2) oscillator 6 may be disposed on the first part 4 (FIGS. 15, 16, 18, 19) or on the second part 5 (FIGS. 1, 2, 3, 4, 5, 6, 7, 8, 9, 10, 11, 12, 13, 14, 17, 20, 21);
 (3) oscillators 3 and 6 may be located relative the surfaces 7 and 8 of frictional interaction so that one of the oscillators 3, 6 is located outside (FIGS. 1, 2, 8, 9, 10, 11, 12, 18, 19) or inside thereof (FIGS. 3, 4, 5, 6, 7, 8, 9, 10, 15, 16, 20, 21), and the working surfaces of the oscillators coincide with the surface of frictional interaction (FIG. 17) and lie in a plane which is perpendicular to the axis of rotation of the rotor 2 (FIGS. 11, 12, 13, 14);
 (4) piezoelectric oscillators may have various shapes (FIGS. 22, 23).

Below are given various possible modifications of piozoelectric oscillators incorporated in the proposed piezoelectric motor (FIGS. 22, 23). In the simplest modification each oscillator may consist of only one piezoelectric element which may be made in the form of:
 (1) rectangular plate (FIGS. 22a,b) with the electrodes located on the opposite surfaces;
 (2) cylinder (FIGS. 22c and e), disc (FIG. 22d) with the electrodes located on flat surfaces thereof;
 (3) hollow cylinder with the electrodes located on its lateral surface (FIG. 22e).
 (4) ring with the electrodes located on its butt-end faces (FIG. 22f);
 (5) portion of a ring or portion of a hollow cylinder (FIGS. 22g, h).

In all the above possible forms of the piezoelectric oscillators 3, 6 (FIGS. 1–21) or their piezoelectric elements 11, 15 the preferable direction of polarization is from electrode to electrode (in FIGS. 22, 23 the polarization is shown by arrows).

It is expedient that the piezoelectric elements 11, 15 be made from piezoceramic materials based on barium titanate or lead titanate-zirconate. The piezoelectric elements 11, 15 made in the form of rectangular plates (FIGS. 22a, b) may be also made from a quartz crystal.

It is also expedient that the electrodes 19 on the surfaces of the piezoelectric elements 11, 15 be formed by chemical deposition of copper or nickel. The leads 20 in the form of thin multi-wire insulated conductors are preferably connected by soldering with the use of a tin-base solder. The shape of the piezoelectric elements and location of the electrodes 19 may be optionally selected so as to meet additional requirements.

More complex constructions of the piezoelectric oscillators 3, 6 incorporate passive components, namely pushers made in the form of thin one-layer or multi-layer plates 23 (FIGS. 23a, b, c, g, h, i). In the case of the multi-layer pushers (FIG. 23) a sound insulation layer 29 made from fluoroplastic may be provided therebetween.

The plates 23 may be made from metal, for instance steel or plastic materials, for instance paper-based laminate. Instead of the plates 23 use may be made of rods or brushes (FIG. 23d).

To attach the plates 23 to the piezoelectric elements 11, 15 the latter are provided with grooves 30 whereinto are inserted and glued said plates 23 (FIGS. 23a, b, c, g, h).

A structional strength of the oscillators 3, 6 may be increased by providing them with hoops 31 (FIGS. 23e, f, h, i). The hoops 31 are made of strong and, if necessary, wear-resistant materials such as, for instance, steel, or materials based on tungsten carbide or titanium carbide.

The plates 23 may be glued in the grooves 30 by means of, for instance, epoxy adhesive, and in the slots of metal hoops (rings) they may be glued in or soldered and welded thereto.

The said plates are not necessarily mounted on the piezoelectric elements 11, 15. A modification of the proposed piezoelectric motor is possible wherein according to the invention the plates 23 are mounted on the passive components of the motor, having a cylindrical surface (FIG. 17).

The proposed piezoelectric motor operates irrespective of whether the plates 23 are disposed on piezoelectrically passive components of piezoelectrically active components of the motor. The location of their attachment infuences only the diameter of the surfaces 7, 8 of frictional interaction: with the increase of said diameter the torque of the shaft increases and the speed of rotation of the rotor 2 decreases.

Figure 22A:
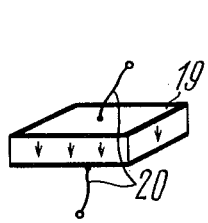
FIG. 22 illustrates various forms of piezoelectric elements in piezoelectric motor of the invention.
Figure 22B:
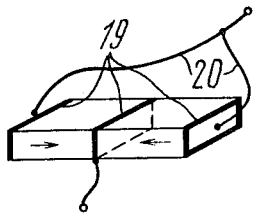
Figure 22C:
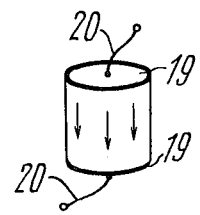
Figure 22D:
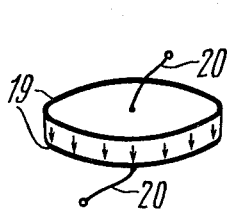
Figure 22E:
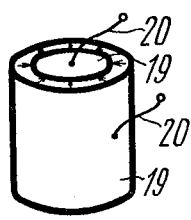
Figure 22F:
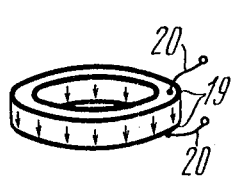
Figure 22G:
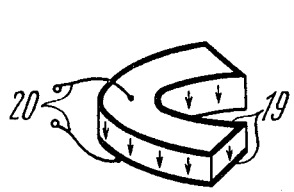
Figure 22H:
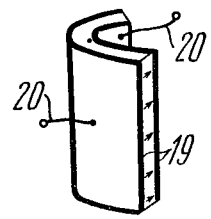

When assembling the motor the plates 23 are forced aside and upon the completion of assembly the free ends of said plates are forced against the corresponding surface 7, 8 of frictional interaction. The length of the plates 23 is selected so that generally it exceeds the distance between the piezoelectric element and the surface of frictional interaction. The end of the plate 23, forced against said surface is arranged at an angle to the surface 7 or 8. The wear-resistant layers 12 (if provided) of the piezoelectric elements 11, 15 of rectangular shape are also disposed at an angle relative the surfaces 7 or 8 of frictional interaction (FIGS. 22a, b). If such wear-resistant layers 12 are not provided, then the piezoelectric elements 11, 15 made in the form of a plate must be inclined to the respective surface 7, 8 of frictional interaction.

For this particular case the angle α of contact between the motor components and respective surfaces 7, 8 of frictional interaction is defined as an angle between a line tangent to the point of contact of the oscillator 3 or 6 and the surface 7 or 8, and the plane of location of oscillator if the latter is made in the form of a plate (FIGS. 1, 2, 15, 16) or the plane of the plate 23 if the oscillator 3 or 6 is provided therewith (FIGS. 3, 4, 5, 6, 7, 8, 9, 10, 11, 12, 13, 14, 18, 19, 20, 21), or if one of the motor parts includes the plates 23 (FIG. 17) interacting with the oscillator. If this angle is assumed to be positive when it increases in a clockwise direction, and to be negative when it increases in a counter-clockwise direction then, taking into account that the direction of rotation of the rotor depends on the sign of the angle α of contact, one may believe (which is practically proved experimentally) that the speed of rotation of the second part 5 of the rotor 2 depends on the sign of the angles α of contact, in which case the following arrangement of the motor components is possible:

(1) the oscillator 3 is disposed on the stator 1, while the oscillator 6 is disposed on the first part 4 of the rotor 2 (FIGS. 18, 19)

(2) the oscillator 3 is disposed within the first part 4 of the rotor 2, while the oscillator 6 is disposed in the second part 5 of the rotor 2 (FIGS. 20, 21). (It is to be noted that in the both cases (1) and (2) if the angle α of contact of the oscillators 3 and 6 have identical signs then the motor according to the invention is a non-reversible one, and if said angles α of contact have opposite signs the proposed motor is, according to the invention, a reversible one).

(3) the oscillator 3 is disposed on the stator 1 and the oscillator 6 is disposed on the second part 5 of the rotor 2 (FIGS. 1, 2, 3, 4, 5, 6, 7, 8, 9, 10, 11, 12, 13, 14, 17);

(4) the oscillator 3 is disposed on the first part 4 of the rotor 2 and the oscillator 6 is also disposed on the first part 4 of the rotor 2 (FIGS. 15, 16). (In cases (3) and (4) if the angles α of contact have identical signs then the proposed motor is reversible one, and if said angles of contact have opposite signs the motor is non-reversible one).

The parts of the proposed piezoelectric motor, having the surfaces 7, 8 of frictional interaction, are made from hard materials having an elevated wear resistance. These are such materials as a hardened steel, hard pig iron, glass, ceramic material preferably bused on $Al_2O_3$, materials based on chromium carbide, titanium carbide, and tungsten carbide, and other materials. For the same purpose use may be made of some types of plastic materials and compressed wood.

The parts 4, 5 of the rotor 2 are shaped depending on desired dimensions and the shape of the motor itself. The piezoelectric motor will be compact if the first part 4 of the rotor 2 is made in the form of a hollow cylinder (rin) as shown in FIGS. 3, 4, 5, 6, 9, 10. A modification of the proposed motor is possible wherein the plates 23 are secured at their one end on the lateral surface of said ring, in which case the first part 4 of the rotor 2 includess a ring with the plates 23, and the oscillators 3,6 are made in the form of bodies of rotation.

The piezoelectric motor of the invention may have a higher speed of rotation which is attained by that the first part 4 of the motor is made in the form of a solid cylinder with the plates 23 secured on its lateral surface (FIG. 17). Furthermore, if the plates 23 are attached to each piezoelectric element 11, 15 the angular velocity of the rotor will be even higher. As shown in FIGS. 1, 2, 18, and 19 the both parts 4 and 5 may simultaneously have cylindrical shape.

The parts 4, 5 of the rotor 2 may be made substantially in the form of a sleeve as shown in FIGS. 7, 8, 15, 16, 20, 21, in which case the proposed piezoelectric motor may be constructed flat at the expense of its decreased height. The said motor may be constructed even more flattened that is with a smaller height, which is attained by that the first part 4 of the rotor 2 is made in the form of a disc mounted on the shaft of the motor (FIGS. 11, 12, 13, 14). In this case modifications of the proposed motor are possible wherein the working surfaces of the oscillators 3, 6 are in contact with the flat surfaces of said disc (FIGS. 13, 14), or wherein the working surface of the oscillator 3 is in contact with the lateral surface of the disc, and the oscillator 6 is in contact with one of the flat surfaces of this disc (FIGS. 11, 12).

The piezoelectric oscillators 3, 6 may be mounted in the stator or the rotor in different ways. It is advisable, however, that the oscillator be properly insulated from the walls and the members used to secure it in position. To this end the surfaces having a mechanical contact with the oscillator are preferably made from sound-insulating materials (such as rubber, fluoroplastic, etc.). These surfaces and the whole stator together with the frame may be made from plastic materials. It is also advisable to use for this purpose heat-resistant plastic materials, especially in the case of piezoelectric motors having a shaft output more than 1 W.

In the above modifications of the proposed motor the contact between the stator 1 and the first part 4 of the rotor 2, as well as between the two parts 4, 5 of the rotor 2 to provide their frictional interaction along the respective surfaces 7,8 may be effected by applying conventional methods, for instance with the aid of a flat spring (1, 2, 11, 13, 18, 19), cylindrical spring provided with a lever (FIGS. 7, 8, 12, 15, 16, 20, 21), magnet, electromagnet, etc. In addition, such contact, in the case of the plates 23, may be effected at the expense of the elasticity of these plates being in contact with the respective surfaces (FIGS. 3, 4, 5, 6, 9, 10, 17).

In accordance with the invention the proposed piezoelectric motor has at least two piezoelectric oscillators alternately connected to the power supply source 32 (FIG. 24). In this description of the invention the connection diagram for connecting the power source 32 is proposed for use as shown in FIG. 24.

When a key 33 (FIG. 24) is operated (the key may be operated mechanically or electrically in the case of a transistorized key or relay) an alternating voltage from the source 32 with a frequency equal or close to the resonant frequency of the piezoelectric element is applied to the electrodes 19 of the piezoelectric element 11 of the piezoelectric oscillator 3 wherein said voltage under the reverse piezoelectric effect is converted into elastic mechanical oscillations, and mechanical waves which are caused thereby are propagating into the other components of the piezoelectric oscillator, and in particular into the wear-resistant layer 12 (FIGS. 1, 2, 15, 16, 17) or the plate 23 (FIGS. 3, 4, 5, 6, 7, 8, 9, 10, 11, 12, 13, 14, 18, 19, 20, 21).

Multiple reflection of elastic mechanical waves from the defining surfaces of the piezoelectric oscillator 3 and the interference of these waves in the direction of their propagation causes the formation of the standing waves. The amplitude of oscillation of particles in such waves is maximal when the frequency of the power supply source is equal to the resonant frequency of the oscillator 3 in the direction of the propagation of elastic waves. The presence of the standing waves of the elastic mechanical oscillations leads to intensive displacement of the oscillator 3 parts in the zones of frictional interaction between the stator and the rotor. According to the presentday theory of operation of a piezoelectric motor, in the zone of frictional interaction of the stator and the rotor there exist two types of oscillations which are displaced in phase perpendicularly with respect to each other. One of these oscillations is excited by the piezoelectric effect, whereas the second type of oscillations is excited by the energy of the first type when the plate or the end of the piezoelectric plate is moving along the cylindrical surface of frictional interaction of the first part 4 of the rotor 2.

As a result of composition of these oscillations a stress produced thereby in the zone of mechanical contact has a steady component. The steady component of the force acting upon the first part 4 of the rotor 2 produces the torque thereof, under the action of which torque the first part 4 of the rotor 2 starts rotating. As the second part 5 of the rotor 2 is frictionally corrected with the first part 4, it also starts rotating in the same direction as the first part does, thereby rotating the shaft 17 of the motor.

After the key 33 is released and the key 34 is operated an alternating voltage from the power supply source 32 is applied to the electrodes 19 of the piezoelectric element 15 of the second piezoelectric oscillator 6 wherein in a similar manner mechanical waves are incited and the torque is produced to rotate the second part 5 of the rotor 2. In this case, if the proposed motor is constructed as a reversible one, the second part 5 of the rotor 2 together with the shaft 17 starts rotating in the opposite direction as compared to the case wherein connected to the power supply source was the first piezoelectric oscillator 3.

In case the proposed motor is non-reversible one, while the diameters of the cylindrical surfaces of frictional interaction of the first oscillator 3 and the second oscillator 6 are not equal, the "rigidity" of the load characteristic changes. Such properties will be appreciated in a driving motor, for instance of tape recorders when the mode of operation thereof is changed from PLAYBACK or RECORDING to FAST WIND or REWIND mode.

If the motor is non-reversible one and two switches 33 and 34 are operated (closing position) the angular velocities of the second part 5 of the rotor 2 are added, whereas in the case of a reversible motor said angular velocities are subtracted. The torque in the first case will be equal to the higher one out of two torques produced by each oscillator, whereas in the second case it will be equal to the lower one out of two said torques produced by said each oscillator. In the first case the speed of rotation of the motor can be increased two times, and in the second case the motor can be operated at a very low rotational speed with the torque being retained. The stabilization of rotational speed is effected by stabilizing the speed of rotation of one part of the rotor relative the second part thereof, which can be readily achieved by conventional methods.

It is advisable that in the case of simultaneously connecting the oscillators 3,6 to one and the same power supply source 32, the operating frequencies of said oscillators do not differ more than by 0.5%. In the case of a discrete connection of the oscillators to the power supply source, with regard to the fact that each piezoelectric element is an exciter (like a quartz crystal in a quartz oscillator), the operating frequency tolerance of each of the oscillators is from 3.6 to 3%.

The use of two shafts rotating at different speeds and, if necessary, in different directions widens the field of application of the proposed piezoelectric motor as compared to the known one-shaft motors.

The proposed piezoelectric motor test has proved that the motor of the present invention has a number of advantages over the prior art. Thus, piezoelectric motors constructed in accordance with the present invention have the efficiency higher than 30%, and the starting torques of 50 kg·cm. Such motors allow an angular displacement in the order of 1 second of arc, or micordisplacement in the order of 1 μm. In combination with an angular position detector they provide such parameters in a stepwise mode of operation which are much better than those of the prior art stepping motors. In addition, they are smaller in size and weight, less costly, and less labour-consuming in manufacture.

While particular embodiments of the invention have been shown and described, various modifications thereof will be apparent to those skilled in the art and therefore it is not intended that the invention be limited to the disclosed embodiments or to the details thereof and the departures may be made therefrom within the spirit and scope of the invention as defined in the claims.

What we claim is:

1. A piezoelectric motor comprising a stator and a rotor one of which includes at least one first piezoelectric oscillator including a piezoelectric element having a working surface, the rotor consisting of a first and a second parts, one of which parts including at least one second piezoelectric oscillator having a piezoelectric element having a working surface, said first and second parts of the rotor being capable of mutually rotating with respect to the axis of rotation of the rotor, said first part of the rotor being in contact with the stator on the first surface of the frictional interaction provided by rotation of at least one length of a straight line about the axis of rotation of the rotor and with said second part of said rotor on a second surface of frictional interaction provided by rotation of at least one length of a straight line about the axis of rotation of said rotor.

2. A piezoelectric rotor according to claim 1, wherein the first part of the rotor together with the stator defines a first angle of contact at the location where they are in contact while the first part of the rotor together with the second part thereof defines a second angle of contact at the location where they are in contact.

3. A piezoelectric motor according to claim 2, wherein the first and the second angles of contact are of the same sign.

4. A piezoelectric motor according to claim 2, wherein the first and the second angles of contact are of different signs.

5. a piezoelectric motor according to claim 1, wherein the first surface of frictional interaction is located on the stator, and the second surface of frictional interaction is located on the first part of the rotor.

6. A piezoelectric motor according to claim 5, wherein the stator comprises a body having a portion of its surface formed by rotation of at least one length of a straight line about the axis of rotation of the rotor.

7. A piezoelectric motor according to claim 5, wherein the first part of the rotor comprises a body having a portion of its surface formed by rotation of at least one length of a straight line about the axis of rotation of the rotor.

8. A piezoelectric motor according to claim 6, wherein the portion of the stator surface is a working surface of at least one first piezoelectric oscillator held in the stator, and the first part of the rotor comprises at least one plate in contact at one end thereof with the working surface.

9. A piezoelectric motor according to claim 6, wherein the first part of the rotor includes at least one first piezoelectric oscillator having its working surface urged against said surface of the stator.

10. A piezoelectric motor according to claim 9, wherein the first piezoelectric oscillator includes at least one plate having one end held in the body of the first piezoelectric oscillator and the other end providing a working surface of the oscillator.

11. A piezoelectric motor according to claim 7, wherein said portion of the surface of the first part of the rotor is a working surface of at least one second piezoelectric oscillator held in the first part of the rotor, and the second part of the rotor comprises at least one plate in contact at one end thereof with such working surface.

12. A piezoelectric motor according to claim 7, wherein the second part of the rotor includes at least one second piezoelectric oscillator having its working surface urged against said portion of the surface of the first part of the rotor.

13. A piezoelectric motor according to claim 12, wherein the second piezoelectric oscillator includes at least one plate having one end held in the body of the second piezoelectric oscillator and the other end providing a working surface of the oscillator.

14. A piezoelectric motor according to claim 1, wherein the first surface of frictional interaction is located on the stator, and the second surface of the frictional interaction is located on the second part of the rotor.

15. A piezoelectric motor according to claim 14, wherein the stator comprises a body having a portion of its surface formed by rotation of at least one length of a straight line about the axis of rotation of the rotor.

16. A piezoelectric motor according to claim 14, wherein the second part of the rotor comprises a body having a portion of its surface formed by rotation of at least one length of a straight line about the axis of rotation of the rotor.

17. A piezoelectric motor according to claim 15, wherein the portion of the stator is a working surface of at least one first piezoelectric oscillator held in a stator, and the first part of the rotor comprises at least one plate being in contact at one end thereof with the working surface.

18. A piezoelectric motor according to claim 16, wherein the first part of the rotor includes one first piezoelectric oscillator having its working surface urged against said surface of the stator.

19. A piezoelectric motor according to claim 18, wherein the first piezoelectric oscillator includes at least one plate having one end held in the body of the first piezoelectric oscillator and the other end providing a working surface of the oscillator.

20. A piezoelectric motor according to claim 16, wherein said portion of the surface of the second part of the rotor is a working surface of at least one second piezoelectric oscillator held in the second part of the rotor and the first part of the rotor comprises at least one plate being in contact at one end thereof with such working surface.

21. A piezoelectric motor according to claim 16, wherein the first part of the rotor includes at least one second piezoelectric oscillator having its working surface being in contact at said portion of the surface of the second part of the rotor.

22. A piezoelectric motor according to claim 21, wherein the second piezoelectric oscillator includes at least one plate having one end held in the body of the second piezoelectric oscillator and the other end providing a working surface of the oscillator.

23. A piezoelectric motor according to claim 1, wherein the first surface of frictional interaction is located on the first par of the rotor, and the second surface of frictional interaction is located on the second part of the rotor.

24. A piezoelectric motor according to claim 23, wherein the first part of the rotor comprises a body having a portion of its surface formed by rotation of at least one length of a straight line about the axis of rotation of the rotor.

25. A piezoelectric motor according to claim 23, wherein the second part of the rotor comprises a body having a portion of its surface formed by rotation of at least one length of a straight line about the axis of rotation of the rotor.

26. A piezoelectric motor according to claim 24, wherein said portion of the first part of the rotor is a working surface of at least one first piezoelectric oscillator held in the first part of the rotor, and the stator comprises at least one plate in contact at one end thereof with the working surface.

27. A piezoelectric motor according to claim 24, wherein the stator includes at least one first piezoelectric oscillator having its working surface being in contact at said surface of the first part of the rotor.

28. A piezoelectric motor according claim 27, wherein the first piezoelectric oscillator includes at least one plate having one end held in the body of the first piezoelectric oscillator, and the other end providing a working surface of the same oscillator.

29. A piezoelectric motor according to claim 25, wherein said portion of the surface of the second part of the rotor is a working surface of at least one second piezoelectric oscillator held in the second part of the rotor and the first part of the rotor comprises at least one plate in contact at one end thereof with such working surface.

30. A piezoelectric motor according to claim 25, wherein the first part of the rotor includes at least one second piezoelectric oscillator having its working surface urged against said portion of the surface of the second part of the rotor.

31. A piezoelectric motor according to claim 30, wherein the second piezoelectric oscillator includes at least one plate having one end held in the body of the second piezoelectric oscillator, and the other end providing a working surface of the same oscillator.

32. A piezoelectric motor according to claim 1, wherein both the first and the second surfaces of frictional interaction are located on the first part of the rotor.

33. A piezoelectric motor according to claim 32, wherein the first part of the rotor comprises a body having at least one first surface and at least one second surface, each of said surfaces being formed by rotation of at least one length of a straight line about the axis of rotation of the rotor.

34. A piezoelectric motor according to claim 33, wherein each of said first and second surfaces of the first part of the rotor is a working surface of at least one first and second piezoelectric oscillators respectively, held in the first part of the rotor, each of the stator and the second part of the rotor including at least one plate in contact at one end thereof with a respective working surface of the first and the second piezoelectric oscillator.

35. A piezoelectric motor according to claim 33, wherein the stator includes at least one first piezoelectrical oscillator having its working surface urged against said first surface of the first part of the rotor.

36. A piezoelectric motor according to claim 35, wherein the first piezoelectric oscillator includes at least one plate having one end held in the body of the first piezoelectric oscillator and the other end providing a working surface of the same oscillator.

37. A piezoelectric motor according to claim 33, wherein the second part of the rotor includes at least one second piezoelectric oscillator having its working surface urged against said second surface of the first part of the rotor.

38. A piezoelectric motor according to claim 37, wherein the second piezoelectric oscillator includes at least one plate having one end held in the body of the second piezoelectric oscillator and the other end providing a working surface of the same oscillator.

39. A piezoelectric motor according to claim 1, wherein at least one of the first and the second piezoelectric oscillators is disposed respectively within the first and the second surfaces of frictional interaction and in contact therewith.

40. A piezoelectric motor according to claim 1, wherein at least one of the first and the second piezoelectric oscillators is disposed respectively outside the first and the second surfaces of frictional interaction and in contact therewith.

41. A piezoelectric motor according to claim 1, wherein the working surface of at least one of the first and second piezoelectric oscillators is in the plane perpendicular to the axis of rotation of the rotor.

42. A piezoelectric motor according to claim 1, wherein one of the piezoelectric elements of at least one of the first and the second oscillators is made in the form of a plate.

43. A piezoelectric motor according to claim 1, wherein one of the piezoelectric elements of least one of the first and the second oscillators is substantially, made in the form of a body of revolution.

44. A piezoelectric motor according to claim 1, wherein one of the piezoelectric elements of at least one of the first and the second oscillators is substantially made in the form of a portion of a body of revolution.

* * * * *